Figure 1:
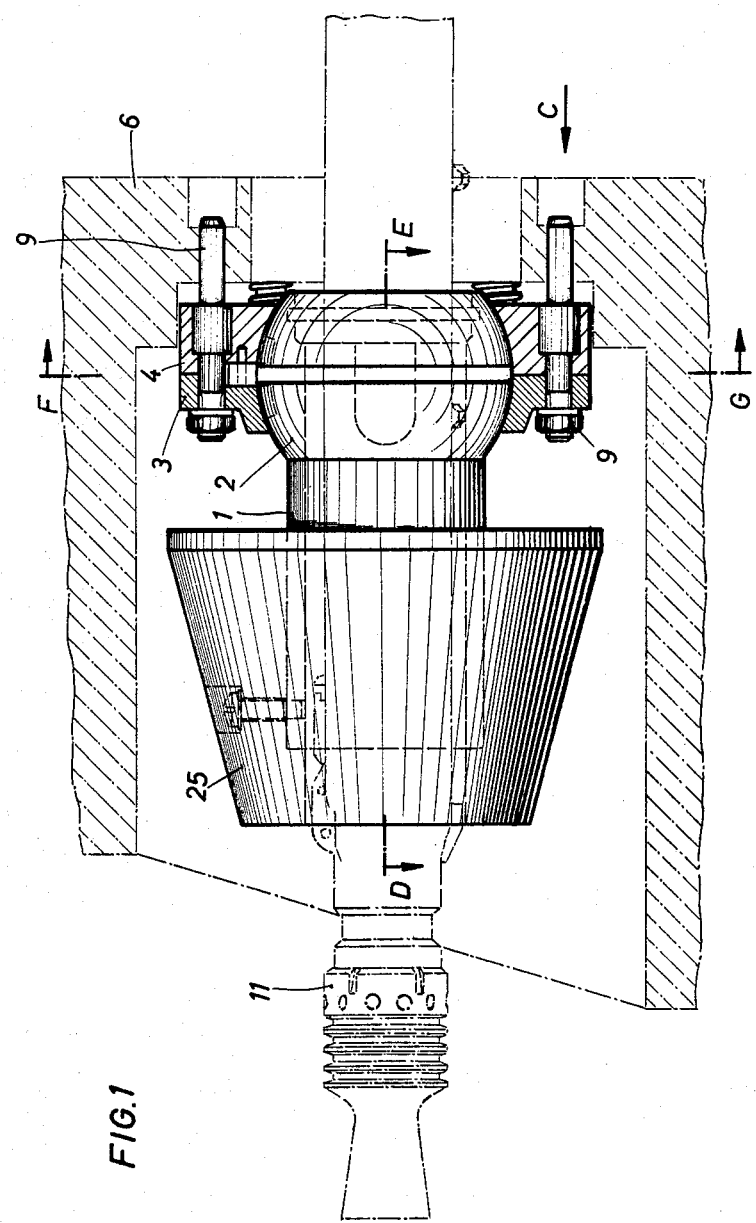

Inventor:

United States Patent Office 3,159,079
Patented Dec. 1, 1964

3,159,079
BALL-AND-SOCKET JOINT TYPE MOUNTING FOR AUTOMATIC FIREARMS
Walter Hildebrand, Neuss (Rhine), Germany, assignor to Firma Rheinmetall G.m.b.H., Dusseldorf, Germany
Filed Jan. 19, 1961, Ser. No. 83,608
Claims priority, application Germany, Jan. 20, 1960, R 27,140
2 Claims. (Cl. 89—37)

This invention relates to a ball-and-socket joint type mounting for automatic firearms. The problem on which the invention is based is to provide a mounting of this type, in particular for installation in tanks, which makes possible the accommodation of an externally non-cylindrical automatic weapon, a satisfactory locking action and rapid mounting and removal of the weapon without special auxiliary means.

It is known per se to mount weapons in a ball-and-socket joint. These constructions, however, can only accommodate cylindrical weapons. Furthermore, the mounting and removal of the weapon is extremely complicated. Moreover, these known ball-and-socket joint type mountings are generally rigidly connected to the mounting support, for example the wall of the tank, but such a mounting is unfavorable for the life of the weapon.

The invention avoids the drawbacks, indicated in broad outline above, of the known constructions, from which it differs advantageously especially in that the weapon or weapon casing is mounted in the ball end of the ball-and-socket joint of the mounting by means of a holder mounted removably in said ball end and is sprung with respect to the support of the mounting, more particularly the wall of the tank, parallel to its longitudinal axis. This springing can be carried out in various ways. Thus, for example, the holder may be sprung in the ball end. However, it is also possible for the ball end or the ball-and-socket joint to be sprung with respect to the mounting support. Furthermore, there is a possibility of combining both the spring suspensions mentioned.

In a preferred form of construction according to the invention, the holder consists of two half shells which can be connected detachably to one another and each have one or more radially projecting lugs at one end for insertion in the ball end by way of recesses provided in the end face of the latter and into an annular groove in the ball end and for securing the shells against axial withdrawal from the ball end by rotation of said shells through 90° about their longitudinal axis.

Figure 4:
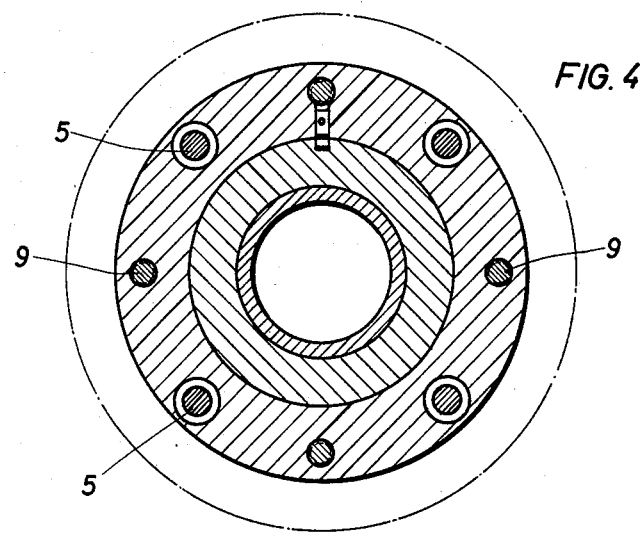
Figure 2:
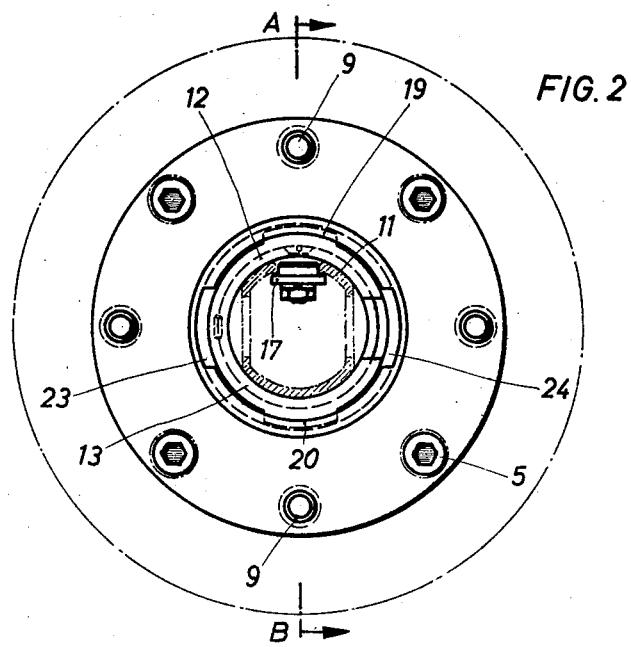
Figure 3:
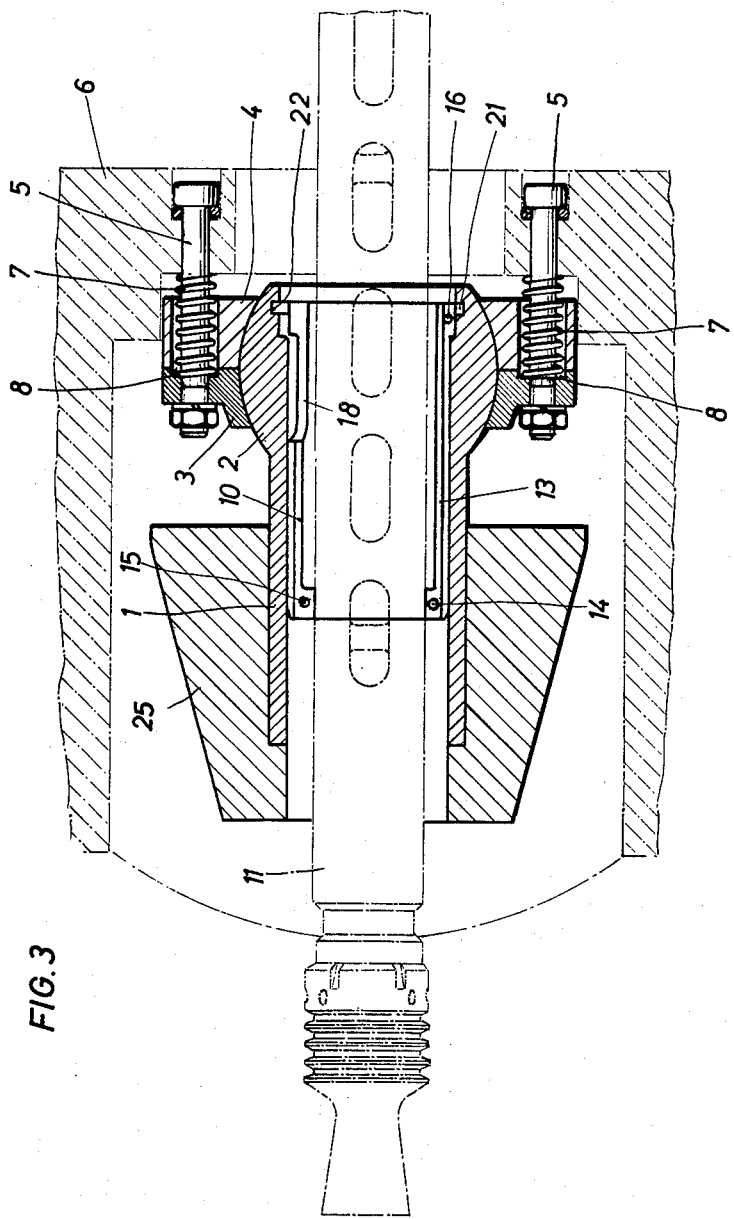

As a further feature of the invention, the ball-and-socket joint consists of two annular bearing shells surrounding the ball end of the ball-and-socket joint mounting and connected to one another by means of bolts extending parallel to the longitudinal axis of said mounting and by which they are secured to the mounting support with the assistance of springs Details of the invention will appear from the following description of the embodiment illustrated in the drawing, in which:

FIGURE 1 is a section on the line A–B through
FIGURE 2, which is a view of FIGURE 1 in the direction of the arrow C,
FIGURE 3 is a section through FIGURE 1 at right angles to the plane of the drawing in the direction D–E, and
FIGURE 4 is a section through FIGURE 1 in the direction F–G.

The ball-and-socket joint type mounting 1 comprises the ball end 2 mounted in a bearing consisting of two annular bearing shells 3, 4 which are connected to one another and secured to the mounting support 6 by means of the bolts 5. Moreover, on the shanks of the screw bolts 5, there are mounted springs 7 supported at one end against the mounting support 6, for example a wall of a tank, and at their other end each against the base of a bore 8. These bores are located in the bearing shell 4 and also extend into and have their base in the bearing shell 3. Moreover, guide pins 9 are provided which likewise engage in the mounting support 6.

A ball end 2 serves to accommodate and secure a holder 10 for the weapon 11 or the weapon casing which, as can be seen in FIGURE 2, does not require to be cylindrical.

The holder 10 consists of two half shells 12, 13 which are detachably connected to one another. This this end, there may be provided close to the ends, in one half shell, holes 14, 15, 16 in which pins located on the other half shell engage. The half shells 12, 13 connected to one another are connected to the weapon casing 11 by means of a connecting piece 17 and have apertures 18 for changing the barrel of the weapon. The half shells 12, 13 furthermore have radially projecting lugs 19, 20, at one end.

The ball end is provided at its end face 21 with an annular groove 22 having recesses 23, 24, at two opposite points, said recesses being located in the end wall of the ball end 2. The radial lugs 19, 20 of the holder consisting of the two shells 12, 13 are pushed into the annular groove 22 by way of said recesses 23, 24. The holder 10 is thereupon rotated through 90° about its longitudinal axis, whereby the lugs 19, 20 are moved away from the recesses 23, 24 and in front of the solid end wall. The holder 10 is thereby secured in the ball end 2 and the ball mounting 1 in bayonet joint fashion. The removal of the holder 10 is carried out in the reverse manner. This can be done just as easily and rapidly as fitting without special tools being required, so that the weapon 11 can be exchanged quickly. Owing to the springing of the mounting 1 with respect to the support 6 thereof, for example the wall of the tank, by means of the spring 7 by way of the ball-and-socket joint 2 to 4, the recoil of the weapon is absorbed yieldingly and the weapon is subjected to less stress than in the case of the rigid connection of mounting and mounting support which has heretofore been customary, so that the life of the weapon is considerably extended. Moreover, for protection against hostile fire, a protective cone 25 is arranged on the ball-and-socket joint mounting 1.

The invention is not limited to the embodiment illustrated and described. Thus, the springing may also be transferred to the ball end 2, in which case the holder 10 is then sprung axially with respect to said ball end. This springing may also be provided in addition to that shown in the drawing. Neither is the invention limited to installation in tanks, but can be employed wherever a weapon has to be passed through a protective shield or a protective wall so that it is movable to a substantial extent. Thus, for example, the invention may be used in military aircraft or other war craft or equipment.

I claim:

1. A ball-and-socket joint type mounting for automatic firearms comprising a ball and socket joint in which a casing of a firearm is mounted, a support for the joint, a holder in the joint mounted removably in the ball end and yieldingly spring mounted with respect to the support of the mounting parallel to its longitudinal axis, said holder comprising two shells detachably connected to one another and having radially projecting lugs at one end for insertion in an annular groove in the ball end behind an end face, the end face of the ball having recesses in the ball end for receiving the lugs to secure the holder against axial displacement and withdrawal from the ball end by rotation of the holder through 90° about its longitudinal axis, and the entire mounting being secured yieldingly to the suport by means of the ball-and-socket joint and the spring mounting and including a plurality of bolts provided with springs mounted within the socket of the joint and the support.

2. A ball and socket joint type mounting according to claim 1, in which each half shell has an aperture therein which together form an opening through which a barrel of the firearm may be removed and inserted.

References Cited by the Examiner
UNITED STATES PATENTS

| | | | |
|---|---|---|---|
| 2,339,783 | 1/44 | Kemmer et al. | 89—37 |
| 2,342,644 | 2/44 | Colby | 89—37 |
| 2,400,322 | 5/46 | Wheeler | 89—37.5 |
| 2,475,935 | 7/49 | Alberti et al. | 89—37 |

BENJAMIN A. BORCHELT, *Primary Examiner.*

SAMUEL W. ENGLE, SAMUEL FEINBERG, ARTHUR M. HORTON, SAMUEL BOYD, *Examiners.*